June 21, 1960 W. F. THORNBURGH 2,941,620
FILTER ELEMENT
Filed Sept. 17, 1958 2 Sheets-Sheet 2

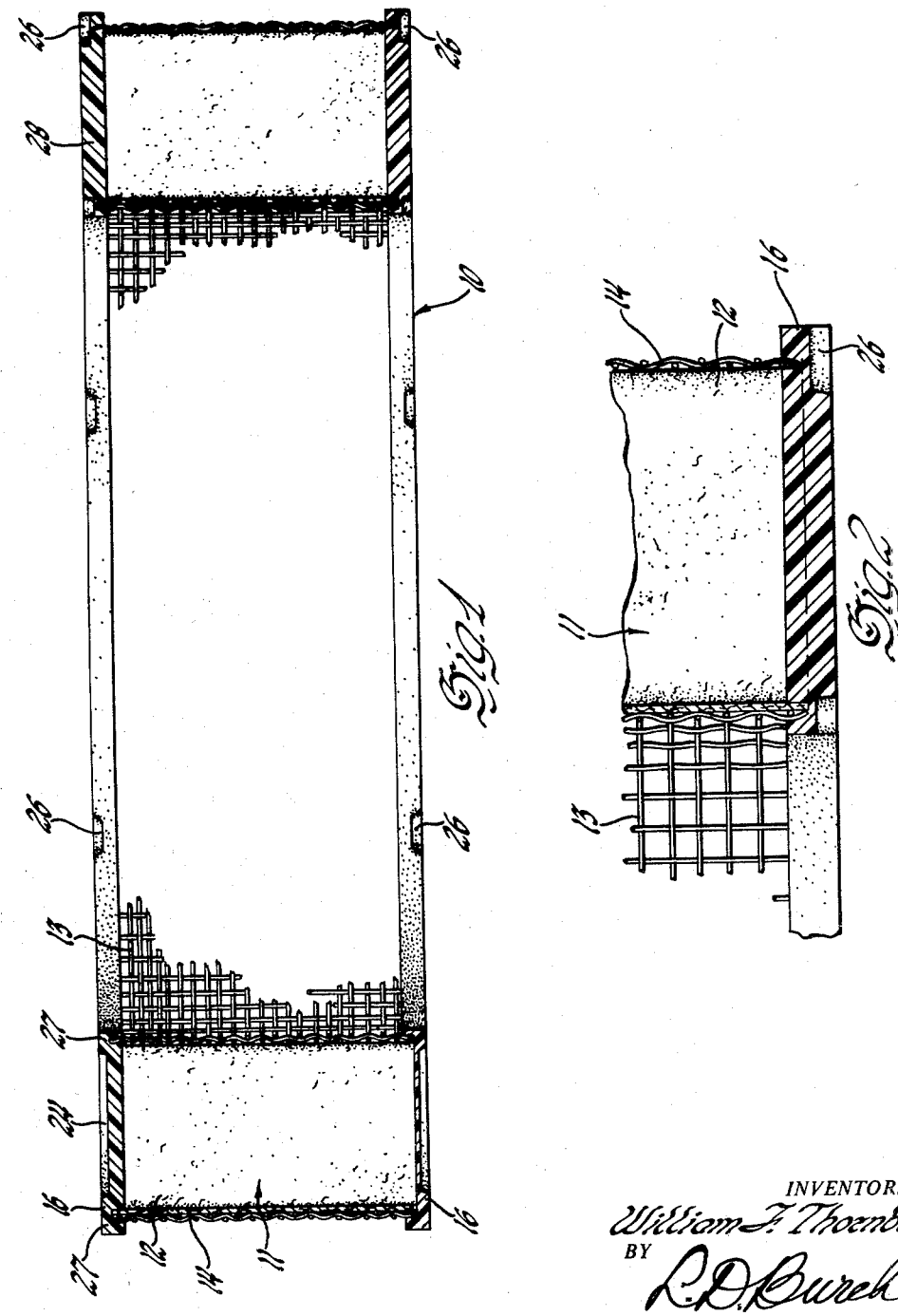

INVENTOR.
William F. Thornburgh
BY
L. D. Burch
ATTORNEY

United States Patent Office 2,941,620
Patented June 21, 1960

2,941,620

FILTER ELEMENT

William F. Thornburgh, Flint, Mich., assignor to General Motors Corporation, Detroit, Mich., a corporation of Delaware Filed Sept. 17, 1958, Ser. No. 761,623

1 Claim. (Cl. 183—71)

This invention relates to filter elements for air cleaners and the like and has particular relation to filter elements for cleaner silencer assemblies applicable for use with the engines employed in motor vehicles and the like.

It is proposed to provide filter elements with annular end plates that are adapted to seal the filter unit against leakage inwardly of the filter element. At the same time it is proposed to so construct these end plates that they will also seal the filter element against leakage of air between the end plates and the filter element supports. Since the materials available for constructing such end plates are somewhat expensive it is proposed to construct the end plates in such a way as to utilize a minimum amount of material.

In the drawing:

Figure 1 is a vertical sectional view through a filter element embodying the invention.

Figure 2 is an enlarged fragmentary cross sectional view of the filter element disclosed by Figure 1.

Figure 3:
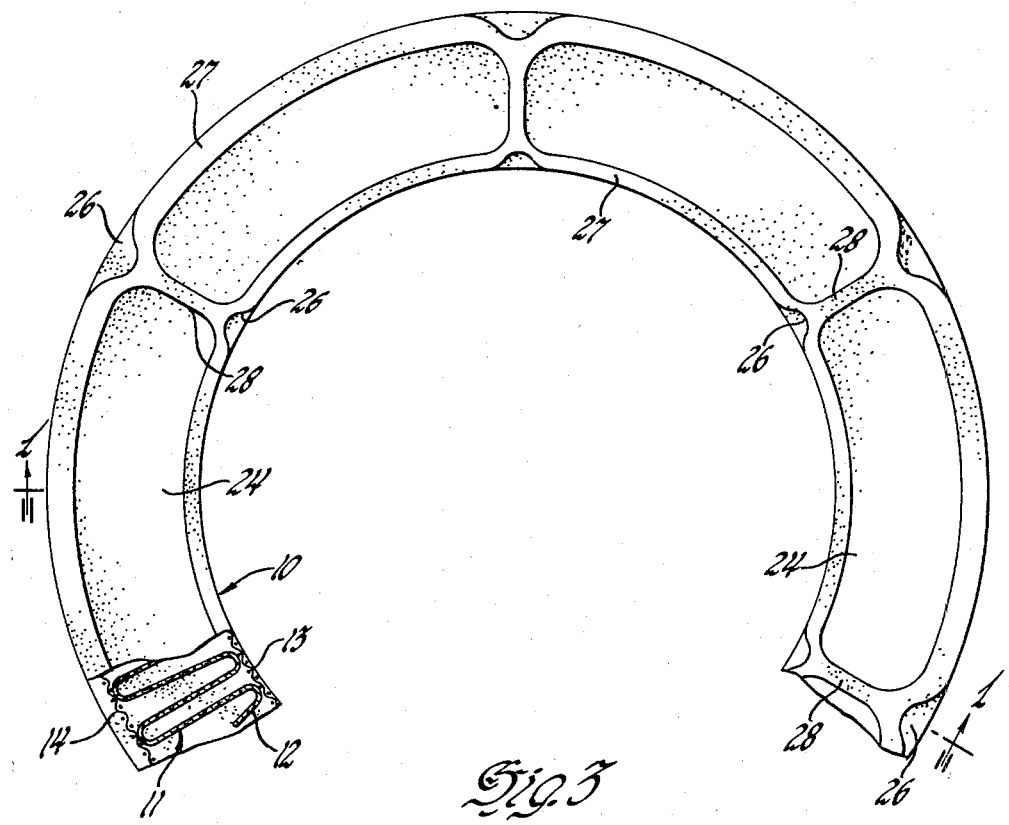
Figure 3 is a fragmentary plan view of the filter element disclosed by Figure 1 with parts of the structure broken away and shown in cross section to better illustrate the invention.
Figure 4:
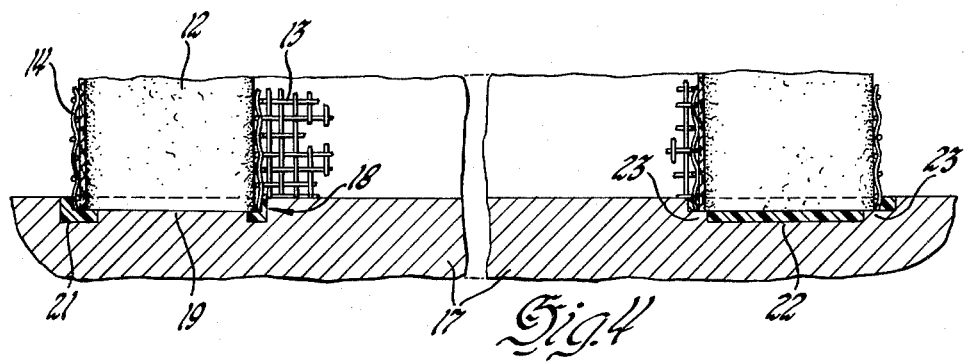
Figure 4 is a fragmentary cross sectional view of a part of a mold with a filter element embodying the invention being formed in the mold.

The filter element 10 embracing the invention comprises a filter unit 11 including an accordion pleated paper or other suitable filter means 12, inner and outer screens 13 and 14, respectively, and end plates 16. The filter unit 11 may be of any form but in the present instance it is shown in the form of an annulus adapted to seat inside of a cleaner silencer assembly casing with the outer annular surfaces of the end plates 16 compressed between annular filter element supports embodied in the casing. The end plates 16 may be constructed of any suitable material that is easily deformable and elastic and that will provide a good means for internally sealing the filter unit 11 against leakage around the ends of the filter means 12 and the screens 13 and 14, and for externally sealing between the outer surfaces of the end plates and the support means of the cleaner silencer assembly casing. A material found satisfactory for this purpose is polyvinyl chloride, a plastic thermally setting material that is easily molded and cured by economical processes, tools and equipment.

The filter element 10 may be constructed by employing a mold such as that indicated at 17 which is provided with annular groove or cavity 18, the cavity 18 having spaced projections 19 extending circumferentially thereabout and between peripherally and radially disposed recesses 21 and 22, respectively. Other spaced projections 23 are formed outwardly of the ends of the radial recesses 22 and outside the peripherally extending recesses 21.

It is proposed to pour the thermally setting plastic material in the cavity 18 and then to project one end of the filter unit 11 into the cavity in such a way that the screens 13 and 14 will rest on the projections 23 and the filter means 12 on the projections 19. When heat is applied to the mold for curing the thermally setting material in the recess 18 the material will adhere to and seal the ends of the screens 13 and 14 and the filter means 12. When the filter unit is withdrawn from the mold 17 the thermally setting substance will separate from the mold thereby providing one of the end plates indicated at 16. The other end plate may be formed in the same manner by refilling the cavity 18 with the thermally setting substance and supporting screens and filter means on the projections 23 and 19 in the manner previously described.

It will be apparent that the projections 19 will form depressions 24 and the projections 23 will form depressions 26 in the end plates 16. It will be further apparent that the recesses 21 and 22 will form the ribs 27 and 28, respectively.

The external surfaces of the ribs 27 and 28 are adapted to engage and be compressed by the filter element support means in the cleaner silencer assembly casing and to prevent leakage of air around the filter element and between the filter element and the end plates 16. The ribs 28 also break up the space between the ribs 27 into the depressions 24 so that if air leaks across one of the ribs 27 at one part of the casing, the leakage may be limited to one of the depressions, provided there is no leakage across the other of the ribs 27 and the ribs 28 at each end of the depression where the leakage may occur.

It is proposed to have the depressions 24 as deep as possible consistent with the requirement that the plastic material seal the ends of the filter means 12. This is desirable in order to reduce as much as possible the amount of thermally setting material required in the construction of the end plates 17. The ribs 27 and 28 also are as narrow as possible to create a considerable unit pressure against the support means in the cleaner silencer assembly casing. This will also reduce the amount of thermally setting material required in the construction of the end plate 16.

I claim:

A filter element for air cleaners and the like and having spaced and annular filter element supports and comprising, a filter unit having annular end plates, said filter unit including annular filter means and screen support means inwardly and outwardly of said annular filter means, said end plates being easily deformable and elastic and being secured to the opposite ends of said filter unit and sealing said filter element against the flow of air internally of said filter element and around said filter unit, said annular end plates being also formed to provide spaced and annular support engaging and sealing ribs adapted to engage said filter element supports and to prevent the flow of air between said end plates and said supports, said end plates being formed to provide depressions on opposite sides of said ribs, said filter unit ends terminating in said end plates substantially at the inner extremities of said depressions, said end plates sealing said filter unit ends within said end plates and across said depressions, certain of said depressions being circumferentially spaced and being between said ribs, said ribs being connected between said circumferentially spaced depressions by radially disposed sealing ribs also adapted to engage said filter element supports and to prevent the flow of air between said end plates and said supports and circumferentially of said supports and between said circumferentially spaced depressions, said filter means having ends terminating in said end plates substantially at the inner extremities of said circumferentially spaced depressions, said screen support means having ends terminating in said end plates substantially at the inner extremities of others of said depressions than said circumferentially spaced depressions, said others of said depressions being disposed outwardly of said annular ribs and at the inner and outer edges of said end plates and extending in spaced relation along said annular ribs and said screen support means, said filter means ends and screen support means ends being sealed internally of said filter element by said end plates.

References Cited in the file of this patent

UNITED STATES PATENTS

| | | |
|---|---|---|
| 1,694,291 | Sywert | Dec. 4, 1928 |
| 2,848,065 | Sebok | Aug. 19, 1958 |

FOREIGN PATENTS

| | | |
|---|---|---|
| 491,730 | Italy | of 1954 |
| 1,185,089 | France | of 1957 |